Patented Mar. 13, 1951

2,544,888

UNITED STATES PATENT OFFICE 2,544,888

PRODUCTION OF A SULFUR DYE

John T. Linster, Wilmington, Del., assignor to E. I. du Pont de Nemours & Company, Wilmington, Del., a corporation of Delaware No Drawing. Application February 25, 1948, Serial No. 10,929

10 Claims. (Cl. 260—133)

This invention relates to a new green sulfur dye and the process for its manufacture. More specifically this invention relates to a new green sulfur dye which has a yellow-green hue of unusual bloom or brightness not heretofore known.

The manufacture of green sulfur dyes from phenylperi-acid salts is well known to those skilled in the art. (Color Index No. 1006.) Usually the phenyl-peri-acid is combined with para-aminophenol by a cold oxidation procedure and the product therefrom is reduced to form a leucoindophenol, which may be termed 1-N-phenylnaphthyl-amine - 4 - (4'-hydroxyanilino) - 8 - sulfonic acid:

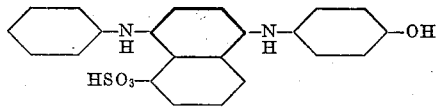

(For convenience hereinafter, it shall be referred to as the leucoindophenol.)

The leucoindophenol is isolated usually and assayed. This product is then sulfurized by refluxing in an aqueous or solvent solution of a soluble metallic or ammonium polysulfide, preferably in the presence of copper sulfate. The resultant sulfur dye is isolated by salting, aërating, or acidifying, followed by filtration and washing. The dye thus obtained may be dried and standardized as a powder. It may also be dried on a flaker or mixed with materials having a hydrotropic or solubilizing effect and made up as a liquid. The dye can be applied to cellulosic fibers or fabrics by any of the methods known to the trade for the application of sulfur dyes.

It is the object of this invention to produce such a green sulfur dye, but a highly concentrated green sulfur dye having a yellower shade of unusual bloom or brightness.

I have found that this objective may be accomplished by sulfurizing the leucoindophenol with a polysulfide in the presence of a Cellosolve, followed by treatment of the sulfurized leucoindophenol with an alkali metal cyanide in aqueous solution at temperatures ranging from about 60° to 65° C. to the boiling temperature with or without aëration. By the term a "Cellosolve" I mean either methyl, ethyl, or butyl Cellosolve, though for the purpose of this invention ethyl Cellosolve is preferred. These compositions are also known as 2-methoxyethanol, 2-ethoxyethanol and 2-butoxyethanol.

The sulfurized leucoindophenol, prepared by sulfurizing leucoindophenol in the presence of a Cellosolve, is slurried with water containing an alkali metal cyanide. On agitation the dye becomes partially dissolved or dispersed in this medium. The temperature is raised to a point ranging between about 60° C. and the boiling temperature. Upon further agitation of the mixture at the elevated temperature, the treated dye reprecipitates. This cyanide treatment may require one to eight hours or more and may be accelerated by aërating at the same time. The cyanide treatment generally may be practiced at a temperature within the range of 75° to 90° C. Since sodium cyanide, for instance, tends to hydrolyze to sodium formate and ammonia under these conditions, the rate of hydrolysis increases with the rise in temperature. Therefore, it is more saving of cyanide to use the lower temperatures. The amount of cyanide used will depend on the amount of cyanide-consuming agents, such as sodium sulfide, sulfur, etc., that is present in addition to the dye and the shade of the final product desired. This will depend on whether the dye is isolated from the sulfurization mass prior to cyanide treatment, or not, and if so, then the completeness of the washing or to the means applied to remove these cyanide-consuming items. Therefore, the cyanide requirements cannot be stated too concisely but, for most cases, where reasonable precautions have been taken to remove or destroy cyanide-consuming products, up to 1.0 part of the cyanide per part by weight of the leucoindophenol should be sufficient.

On completing the contact with the cyanide, the product may be isolated by filtering or other means, and washed free of the cyanide. This product may then be prepared for dye application in any of the customary forms, such as powder, flakes, pastes, or liquids.

The shade of the product may be varied by varying the total quantity of cyanide used in the treatment step. This may be controlled by adding cyanide in increments, sampling and testing after each increment, until the desired shade or effect is obtained.

In accordance with one embodiment of the invention, the sulfurization mass is aërated by bubbling air through the reaction mass. This precipitates the dye and destroys some or all of the other cyanide-consuming constituents. The resulting slurry can be treated directly with the cyanide. On separation of the product, a high yield is obtained. In another possible practice of the embodiment of this invention, the sulfurized leucoindophenol is precipitated by aëration, filtered and washed free of soluble constituents. The dye is then slurried in water, and the cyanide treatment administered. Upon re-isolation of the dye, the product has an unusual brightness or bloom.

In the event that a salting out process is used to precipitate the sulfurized leucoindophenol, it is desirable to remove the excess salts and polysulfides by filtering and washing the dye before treating with a soluble cyanide. This results in a substantial conservation of cyanide, and an attractive shade, but at a somewhat lower yield of dye.

The cyanide should be handled with caution, since cyanides are very poisonous even in minute quantities. Hydrocyanic gas is produced when a cyanide contacts an acid and precautions should be taken to assure alkaline conditions before the cyanide is added to the mass to be treated.

The following examples, in which all parts are by weight unless otherwise specified, are illustrative of the invention.

*Example 1*

One part of the leucoindophenol as a 35-40% paste is slurried in 2.5 parts of sodium tetrasulfide, as a 40-45% solution. One part of Cellosolve (the monoethyl-ether of ethylene glycol) is added, followed by 0.6 part of a 50% aqueous solution of copper sulfate pentahydrate. Sufficient water is added to adjust the total charge weight to 9.5 parts.

The mixture is refluxed vigorously with agitation for 15 to 30 hours. The condenser is set for distillation, and distillation continued until 70% or more of the Cellosolve is recovered. An antifoam agent may be added, if needed. The volume is restored by adding water. About 0.8 part of sodium chloride is stirred in and the charge is filtered. The cake, thus obtained, is washed free of sulfides with 7 to 10% brine and then fresh water washed, until most of the brine has been removed.

The washed cake is slurried in ten parts (based on leucoindophenol) of water and made alkaline to phenolphthalein, if necessary, by adding caustic soda. Sodium cyanide is added, as a solid or in solution, to the extent of 0.06 to 0.10 part. The mass is stirred at 80° to 90° C. until the dye reprecipitates. The slurry is filtered and the cake washed free of cyanides and dried.

The product is a green sulfur dye with yellow shade of unusual bloom, not heretofore obtainable.

*Example 2*

The leucoindophenol is sulfurized as in Example 1. After the Cellosolve has been recovered by distillation, the charge is diluted with an equal volume of water. The temperature is maintained between 60° to 70° C. and a stream of air is bubbled through the mix until all the dye is precipitated. The dye is filtered and re-slurried with water. The cyanide treatment is conducted as in Example 1. The use of this treatment gives distinctly yellower shades of green than are yielded by other methods. The brightness or bloom is also improved.

*Example 3*

The leucoindophenol is sulfurized and precipitated as in Example 2. The cyanide treatment is conducted as in Example 1, but without prior isolation of the color.

From the foregoing description it can be seen that my invention makes a valuable contribution to the sulfur color art by providing a much needed new green sulfur dye having a yellower green shade of unusual bloom or brightness and the process for its manufacture. My invention is valuable also in the fact that the shade of the dye may be conveniently varied by varying the total quantity of cyanide used in the treatment until the desired shade is obtained.

As many other widely different embodiments of this invention may be made without departing from the spirit and scope thereof, it is to be understood that no limitations are intended except as are specifically recited in the claims or are imposed by the prior art.

What is claimed is:

1. The process for manufacturing a green sulfur dye comprising sulfurizing, in the presence of a composition of the group consisting of 2-methoxyethanol, 2-ethoxyethanol and 2-butoxyethanol, the leucoindophenol obtained by co-oxidizing a salt of 1-N-phenylnaphthylamine-8-sulfonic acid and 4-aminophenol and reducing the product, and subsequently treating the sulfurized leucoindophenol with an alkali metal cyanide.

2. The process for manufacturing a green sulfur dye from the leucoindophenol obtained by co-oxidizing a salt of 1-N-phenylnaphthylamine-8-sulfonic acid and 4-aminophenol and reducing the product, comprising sulfurizing the leucoindophenol with a polysulfide in the presence of a composition of the group consisting of 2-methoxyethanol, 2-ethoxyethanol and 2-butoxyethanol and copper sulfate, and subsequently treating the sulfurized leucoindophenol with an alkali metal cyanide.

3. The process for making a green sulfur dye from the leucoindophenol obtained by co-oxidizing a salt of 1-N-phenylnaphthylamine-8-sulfonic acid and 4-aminophenol and reducing the product, comprising sulfurizing the leucoindophenol with a polysulfide in the presence of 2-ethoxyethanol and copper sulfate, aerating the entire reaction mass, and subsequently treating the resulting mass with an alkali metal cyanide.

4. The process for making a green sulfur dye from the leucoindophenol obtained by co-oxidizing a salt of 1-N-phenylnaphthylamine-8-sulfonic acid and 4-aminophenol and reducing the product, comprising sulfurizing the leucoindophenol with a polysulfide in the presence of 2-ethoxyethanol and copper sulfate, aerating the entire reaction mass, filtering, washing the residue, agitating the washed residue with water, and subsequently treating the residue with sodium cyanide in an amount up to 1.0 part by weight per part of the leucoindophenol.

5. The process for making a green sulfur dye from the leucoindophenol obtained by co-oxidizing a salt of 1-N-phenylnaphthylamine-8-sulfonic acid and 4-aminophenol and reducing the product, comprising sulfurizing the leucoindophenol in the presence of 2-ethoxyethanol and copper sulfate, precipitating the sulfurized leucoindophenol by salt treatment, filtering, washing the residue with brine and then fresh water, and subsequently stirring the residue with an aqueous solution of sodium cyanide.

6. A green sulfur dye prepared from the leucoindophenol obtained by co-oxidizing a salt of 1-N-phenylnaphthylamine-8-sulfonic acid and 4-aminophenol and reducing the product, by sulfurizing the leucoindophenol in the presence of a composition of the group consisting of 2-methoxyethanol, 2-ethoxyethanol and 2-butoxyethanol and then treating the sulfurized leucoindophenol with an alkali metal cyanide.

7. A green sulfur dye prepared from the leucoindophenol obtained by co-oxidizing a salt of 1-N-phenylnaphthylamine-8-sulfonic acid and 4-aminophenol and reducing the product, by sulfurizing the leucoindophenol in the presence of 2-ethoxyethanol and copper sulfate, aërating the reaction mass, and subsequently treating the sulfurized leucoindophenol with an alkali metal cyanide.

8. A green sulfur dye prepared from the leucoindophenol obtained by co-oxidizing a salt of 1-N-phenylnaphthylamine-8-sulfonic acid and 4-aminophenol and reducing the product by sulfurizing the leucoindophenol in the presence of 2-ethoxyethanol and copper sulfate, aërating the reaction mass, filtering, washing the residue, agitating the washed residue with water, and subsequently treating the residue with sodium cyanide in an amount up to 1.0 part by weight per part of the leucoindophenol.

9. In the process for producing a green sulfur dye from the leucoindophenol obtained by co-oxidizing a salt of 1-N-phenylnaphthylamine-8-sulfonic acid and 4-aminophenol and reducing the product by sulfurizing the leucoindophenol with a polysulfide in the presence of copper sulfate and an aqueous solution of a composition of the group consisting of 2-methoxyethanol, 2-ethoxyethanol, and 2-butoxyethanol; the step of treating the resulting mass with an aqueous solution of an alkali metal cyanide.

10. In the process for producing a green sulfur dye from the leucoindophenol obtained by co-oxidizing a salt of 1-N-phenylnaphthylamine-8-sulfonic acid and 4-aminophenol and reducing the product, by sulfurizing the leucoindophenol with a polysulfide in the presence of copper sulfate and an aqueous solution of 2-ethoxyethanol, precipitating the sulfurized leucoindophenol and washing the product; the step of treating the resulting mass with an alkali metal cyanide in an amount up to 1.0 part by weight per part of the leucoindophenol in an aqueous solution at a temperature ranging from 60° C. to the boiling temperature of the mass.

JOHN T. LINSTER.

REFERENCES CITED

The following references are of record in the file of this patent:

UNITED STATES PATENTS

| Number | Name | Date |
| --- | --- | --- |
| 1,609,927 | Wutke | Dec. 7, 1926 |
| 1,815,144 | Hertz | July 21, 1931 |
| 2,125,924 | Johnson | Aug. 9, 1938 |